C. E. JOHNSON.
STABLE CLEANER.
APPLICATION FILED OCT. 11, 1918.
1,334,458.
Patented Mar. 23, 1920.
2 SHEETS—SHEET 2.
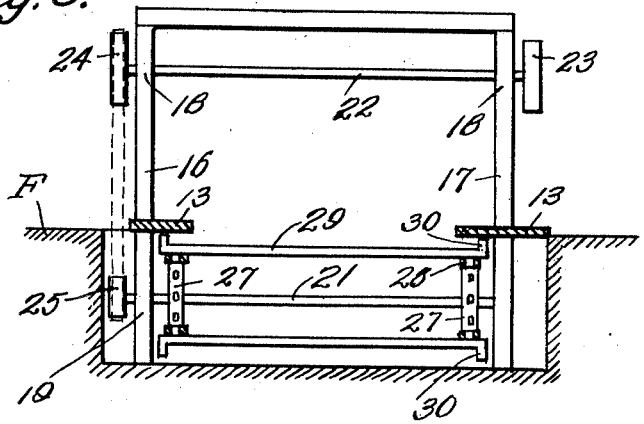
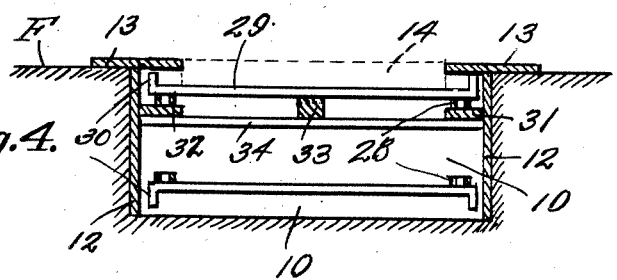
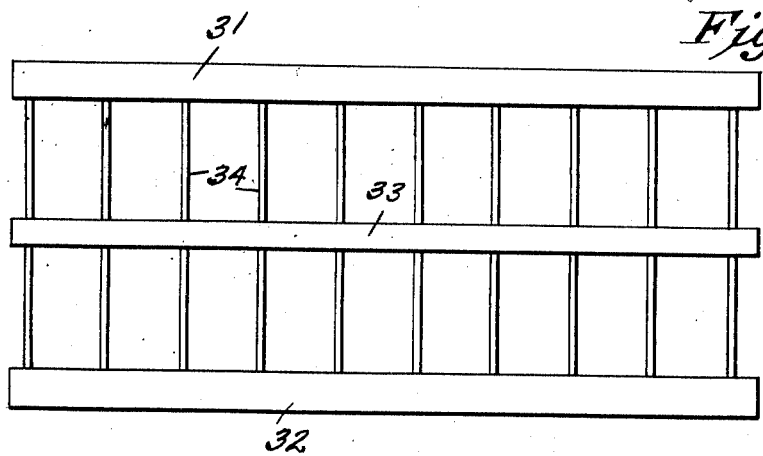
Witnesses
James F. Crown,
N. L. Clamer.
By
Inventor
Carl E Johnson,
Richard B Owen,
Attorney

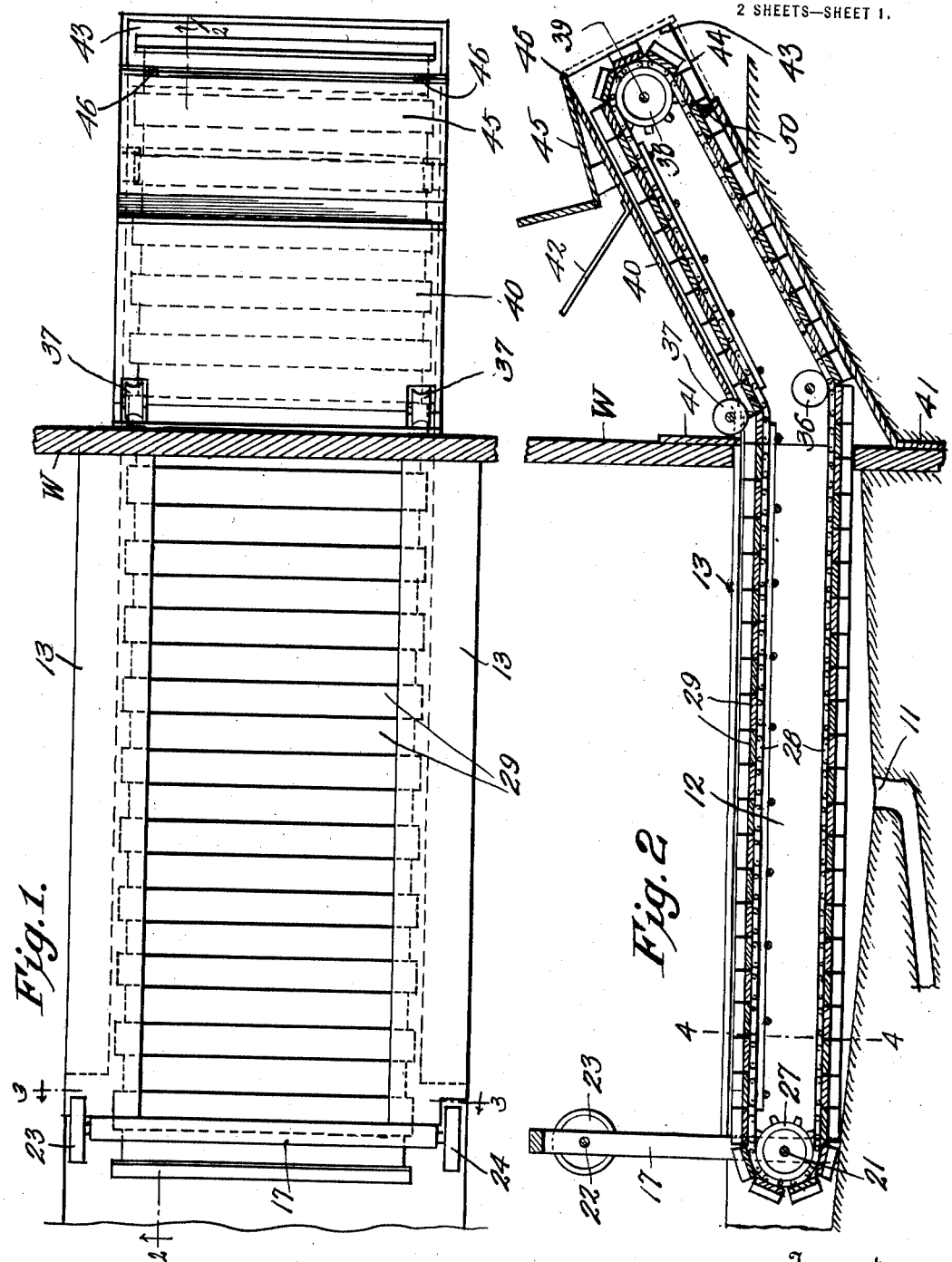

UNITED STATES PATENT OFFICE.

CARL E. JOHNSON, OF JARRETTS, MINNESOTA.

STABLE-CLEANER.

1,334,458.   Specification of Letters Patent.   Patented Mar. 23, 1920.

Application filed October 11, 1918. Serial No. 257,768.

*To all whom it may concern:*

Be it known that I, CARL E. JOHNSON, a citizen of the United States, residing at Jarretts, in the county of Wabasha and State of Minnesota, have invented certain new and useful Improvements in Stable-Cleaners, of which the following is a specification.

This invention relates to conveyers, and more especially to those which are endless; and the object of the same is to produce a device for installation in a trough extending across a stable floor just in the rear of the stalls wherein animals are housed, then through the wall of the building and thence upward in an inclined trunk, and an endless conveyer within the trough and trunk adapted when moved to carry the manure out of the stable and up within the trunk and deliver it at a point sufficiently high so that it may be put onto a wagon without involving the manual labor necessary to load the wagon.

A further object of the invention is to adopt structural details in the trough and conveyer for keeping the same as clean as possible.

A yet further object is to provide means within the trunk for flushing the lower stretch or run of the conveyer where it returns to the stable.

Details are set forth in the following specification and claims and attention is drawn to the drawings wherein—

Figure 1 is a plan view of this structure complete.

Fig. 2 is a longitudinal section on the line 2—2 of Fig. 1.

Figs. 3 and 4 are sectional details on the lines 3—3 of Fig. 1 and 4—4 of Fig. 2 respectively.

Fig. 5 is a plan view of the support for the upper run or stretch of the conveyer.

The conveyer within the barn or stable is mounted within a trough 10 which is preferably formed of cement and has its bottom pitched as shown in Fig. 2 so that it will drain into a pit 11 at a convenient point, thus preventing water and sediment from collecting in the trough. The walls may be lined with upright boards or plates 12, and these may support overhanging coping plates 13, as best seen in Fig. 4 which will lie about level with the floor F of the stable or other building and therefore not reduce the floor space. It is possible to employ a cover 14 as illustrated in dotted lines in Fig. 4 when this conveyer is not in use, and therefore animals housed within the stalls back of which the trough passes may not become frightened by putting their feet down into the trough. At one end of the trough are uprights 16 and 17 having bearings 18 and 19 in which are journaled upper and lower shafts 21 and 22, the latter carrying a pulley 23 at one end adapted to be connected with a source of power. At its other end it carries a pulley 24 adapted to be belted to a pulley 25 on the first mentioned shaft 21, which may therefore be termed the driven shaft. Sprocket wheels 27 are mounted on this shaft and carry the sprocket chains 28 of an endless conveyer, whereby, as the driven shaft is rotated, the conveyer will be moved longitudinally in the trough. The slats or cross bars 29 of the conveyer are made alternately longer and shorter as indicated in dotted lines in Fig. 1, and each has its ends upturned as at 30, the ends of the shorter slats necessarily standing in a plane inside the ends of the longer slats so as to permit the belt to have the necessary movement in flexing. The slats are secured upon the links of the chain 28 and are of such lengths that their upturned ends 30 travel under the coping 13, as seen in Figs. 3 and 4, and therefore material on the floor F which is swept or scraped into the trough will fall on the slats of the conveyer rather than past their ends into the trough.

The upper stretch or run on the conveyer is mounted on a support shown in plan view in Fig. 5. Cross bars or rods 34 are disposed within the trough and pass completely through the conveyer from one plate 12 to the opposite plate, and these bars have longitudinal tracks 31 and 32 which underlie the chain, and a central and thicker track 33 which underlies the slats. It will be seen that the support not only sustains the upper stretch of the conveyer and the weight of the material thereon, but is necessary when the cover is in place and the animals may step upon the cover, for obviously something more substantial is then required than an endless belt or carrier. The cross bars 34 also serve as braces for the side plates 12, although these plates may well be carried by the cement walls of the trough itself.

As indicated in section in Fig. 2 the trough is preferably carried through one wall W of the stable, and outside the wall a sheet metal trunk 40 is provided as a continuation of the trough, the inner end of the trunk having ears 41 secured to the wall or otherwise so that the trunk shall incline upward. It is quite possible to support the outer end of the trunk by cables from the wall of the building, as indicated at 42. Its outer extremity is open as at 43 and its bottom is open as at 44, and an L-shaped door 45 is hinged at 46 and adapted to close these openings. It is understood that the outer end of this trunk rises to a considerable height, so that a wagon may be driven beneath it and receive the matter delivered through the opening 44.

The supports for the upper run of the conveyer may be duplicated in the trunk. Where the inner end of the trunk unites with the wall and with the side walls of the trough, idler wheels 37 and 36 are disposed over the upper and lower stretches of the conveyer. The upper idler 37 has a channeled face as seen in Fig. 1, its channel being of sufficient width to embrace both series of upturned ends 30 of the slats, which ends lap each other slightly as the conveyer makes a turn at this point. The lower idler wheels 36 may have flat faces, as they overlie the chains of the lower run of the conveyer at the corresponding angle. A shaft 39 is mounted in bearings at the outer end of the trunk which carries sprocket wheels 38 over which the chains run. Disposed in the bottom of the trunk in rear of the opening 44, is an upstanding brush 50 which cleans the material from the face of the slats before they return into the stable. Occasionally the trunk will be flushed by pouring water into its outer end, and this water will travel down the bottom of the trunk and along the bottom of the trough, and escape into the outlet 11, so that when material is collected by the brush it will be flushed from time to time. When the stable floor is cleaned with water, it may run onto the conveyer, but it will pass through the slats of the same and find its outlet at 11 as described. I have indicated a cover in dotted lines at 14 in Fig. 4, but it is quite possible that the bedding of the animals may be used for a cover to this device, as the upper run of the conveyer is quite firmly supported by the structure illustrated in Fig. 5 and a separate cover may not always be necessary.

The use of the device is obvious. When power is applied to the pulley 23 from any convenient source, it is communicated by belt from the pulley 24 to the pulley 25, and from the latter to the sprockets 27 and thence to the conveyer.

This moves outward along its upper stretch and upward with the trunk, delivering the material thereon out the opening 44 into a pile outside the building, or into a wagon body if the same be run under the elevated trough and carrier. As it is quite customary to use the manure at once by spreading it on the fields, the owner will doubtless have a wagon under the outlet at each cleaning of the structure and deliver the manure directly into the wagon to be carried thence to the field and spread without additional labor or loading. I have shown a pulley at 23 adapted for the reception of a belt, but it is quite possible that a crank could be inserted in this pulley so that it could be rotated by hand.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

In a conveyer, the combination with a horizontal trough and an oblique trunk connected at one end therewith, and transverse shafts in the outer ends of the trunk and trough, these shafts carrying sprocket wheels; of a pair of endless chains moving over said sprocket wheels, slats connecting opposite links in said chains and made alternately long and short, each slat upturned at its ends and the ends standing out of alinement with each other, and idler rollers above the upper and lower run of said chains, the upper idlers having dished faces overlying both sets of upturned ends and the lower idlers overlying the chains.

In testimony whereof I affix my signature in presence of two witnesses.

CARL E. JOHNSON.

Witnesses:
F. A. HODGE,
F. J. RYAN.